J. Badger,
Boring Wood,
Nº 572. Patented Jan. 20, 1838.
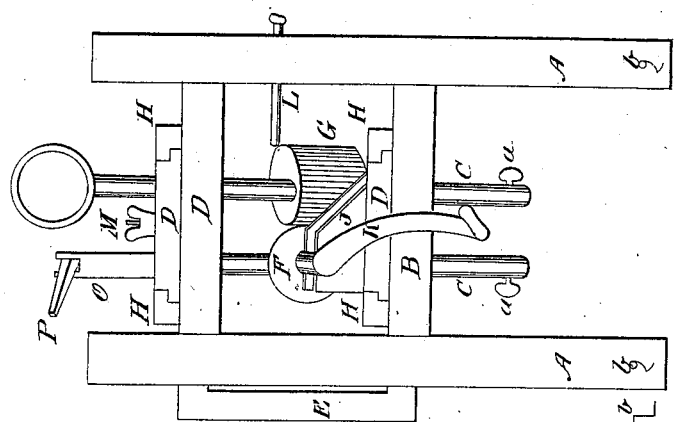
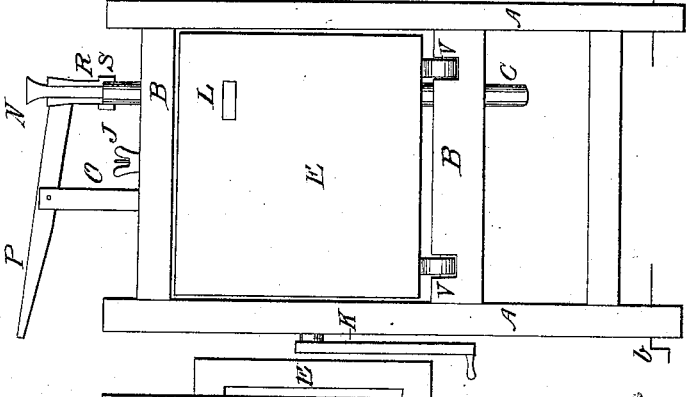
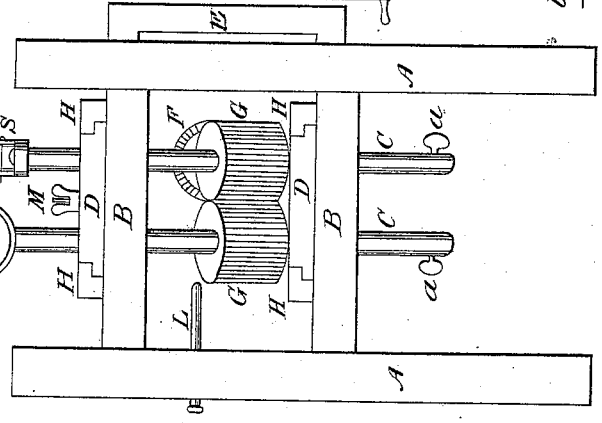
Witnesses
Dan. Buckley
Joseph Hunter
Inventor
Jared Badger

UNITED STATES PATENT OFFICE.

JARED BADGER, OF BROOKLYN, CONNECTICUT.

MACHINE FOR BORING FRAMING-TIMBER.

Specification of Letters Patent No. 572, dated January 20, 1838.

*To all whom it may concern:*

Be it known that I, JARED BADGER, of Brooklyn, in the county of Windham and State of Connecticut, have invented a new and useful Improvement in Machines for Boring Framing-Timber and other Purposes, called "Badger's Improved Boring-Machine;" and I do hereby declare that the following is a full and exact description thereof.

The machine is constructed with four posts, about three feet high, into which are framed on the back and front two girths, as per drawings Figures 1 and 2, A, A, B, B. These girths are about two feet long, and placed one about four inches from the top of the posts, and the other so as to leave a space between them of about two feet. On each end of the frame are three girths 1½ feet long, as per drawing, Fig. 3, A, A, B, B, B, framed into the posts, so that the lower side of the top one will be even with the upper side of the side girth, and the upper side of the middle girth even with the under side of the lower girth on the side, the lower girth about four inches from the lower end of the posts. In each of the middle girths, on the top, and near the ends of them, are two rollers, as per drawing, Fig. 3, V, V, about two inches from the lower end of the posts, through each passes a screw with a crank, to confine the frame on the stick of timber to be bored, as b, b, this constitutes a frame for a bore to move in, which is as follows, viz., two pieces of board the right dimensions, to fill the space from the rollers on the middle girth in the end as E, Fig. 3, to the upper girth. A top and bottom of the same width of the ends, and about two feet six inches long, with a cavity cut through both, of sufficient dimensions for the shafts C, C, to move as much as required for the uses of said machine, this bore or carriage moves on the rollers V, V, from right to left, or the reverse, as occasion requires, for the length of the mortise, and is kept in place by an iron bolt passing through the open girth at one end, and through a mortise in the top and bottom of the bore, and fastened by a nut at the top, as T, Fig. 3. On the upper side of the top and bottom of this bore or carriage, are two slides of sufficient length and width, so arranged as to move horizontally across the carriage or bore, to regulate the distance from the face of the timber, to the holes to be bored, and held in place by a screw and nut as M, Fig. 1, and kept in place sidewise by guides at H, H, H, H. Through these slides pass two shafts C, C, about two feet six inches long, of convenient size, in the lower end of which are sockets, in which the augers are affixed and held in place by thumb screws a, a. About the middle of the shafts are trundle heads or pinion wheels G, G, which mesh into each other, and are turned by a wheel with cogs on one end, which mesh into one of the pinions. At the other end of the cog wheel is a shaft of sufficient length for a crank to be attached, so as to clear the end of the slide, which shaft has a bearing as I. By means of this crank, the cog wheel is turned, and thus the pinions are turned one to the right and the other to the left. These shafts being all the way of a size, will move up or down as the auger shoves in or is withdrawn. For the convenience of using but one auger at a time, an iron slide is fixed in the end of the bore or carriage, so that when the pinion next it is raised as high as it can be, it will rest on it, and prevent it from turning. On the top of one of the shafts is a loop as N, by which the auger is withdrawn with the hand. On the top of the other is a swivel as S, Fig. 2, with cheek pieces on two opposite sides, to which a band of iron, R, is attached, through which the end of a lever P is passed, operating upon a fulcrum in the top of a post O, placed in the top slide, by which the other auger is withdrawn. The above is designed to be varied in dimensions to suit the business for which it is intended and made with one or more augers.

What I claim as my invention and desire to secure by Letters Patent is—

The mode of regulating the auger or augers crosswise of the timber by means of the slides D, D, Figs. 1 and 2 at the top and bottom of the bore or carriage, as described in the foregoing description or specification.

JARED BADGER.

Witnesses:
DAVID CLARK,
EMILY CLARK.